United States Patent
Weber

(10) Patent No.: US 10,876,559 B2
(45) Date of Patent: Dec. 29, 2020

(54) PANEL ASSEMBLY FOR A MOTOR VEHICLE

(71) Applicant: Bayerische Motoren Werke Aktiengesellschaft, Munich (DE)

(72) Inventor: Marc Weber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 123 days.

(21) Appl. No.: 16/051,585

(22) Filed: Aug. 1, 2018

(65) Prior Publication Data

US 2018/0355897 A1    Dec. 13, 2018

Related U.S. Application Data

(63) Continuation of application No. PCT/EP2016/079234, filed on Nov. 30, 2016.

(30) Foreign Application Priority Data

Feb. 2, 2016    (DE) .................... 10 2016 201 521

(51) Int. Cl.
| | |
|---|---|
| *F16B 5/06* | (2006.01) |
| *B62J 17/00* | (2020.01) |
| *F16B 5/02* | (2006.01) |
| *B60R 13/02* | (2006.01) |

(52) U.S. Cl.
CPC ........ *F16B 5/0664* (2013.01); *B60R 13/0206* (2013.01); *B62J 17/00* (2013.01); *F16B 5/02* (2013.01)

(58) Field of Classification Search
CPC ........ F16B 5/0664; F16B 5/0657; F16B 5/02; B60R 13/0206; B62J 17/00

USPC ....................................................... 296/1.08
See application file for complete search history.

(56) References Cited

U.S. PATENT DOCUMENTS

| | | | |
|---|---|---|---|
| 6,308,488 B1 * | 10/2001 | Hoshino | B60R 13/0206 |
| | | | 296/146.7 |
| 7,213,378 B2 | 5/2007 | Randez Perez et al. | |
| 7,753,423 B2 * | 7/2010 | Zellner, Jr. | B60R 13/0206 |
| | | | 248/27.3 |

(Continued)

FOREIGN PATENT DOCUMENTS

| | | |
|---|---|---|
| CN | 1648470 A | 8/2005 |
| CN | 103851287 A | 6/2014 |

(Continued)

OTHER PUBLICATIONS

International Search Report (PCT/ISA/210) issued in PCT Application No. PCT/EP2016/079234 dated Feb. 3, 2017 with English translation (six pages).

(Continued)

*Primary Examiner* — Jason S Morrow
(74) *Attorney, Agent, or Firm* — Crowell & Moring LLP

(57) ABSTRACT

A panel assembly for a motor vehicle includes a first panel element and a second panel element that is connected to the first panel element. The first panel element has a fastening extension that is connected to a receiving section on the second panel element by way of a connector. The fastening extension further has a latch that is to interlock with a locking opening in the receiving section of the second panel element.

12 Claims, 2 Drawing Sheets

(56) References Cited

U.S. PATENT DOCUMENTS

| | | | |
|---|---|---|---|
| 8,615,962 B1* | 12/2013 | Perez | B60R 13/0206 24/292 |
| 10,414,365 B2* | 9/2019 | Davenport | B60R 13/04 |
| 2003/0070390 A1* | 4/2003 | Dunn | B60R 13/04 52/716.7 |
| 2005/0054229 A1* | 3/2005 | Tsuya | B60R 13/0206 439/280 |
| 2005/0093310 A1 | 5/2005 | Lee | |
| 2012/0187722 A1* | 7/2012 | Dawe | F16B 5/0664 296/191 |
| 2013/0174389 A1* | 7/2013 | Dole | B60R 13/0206 24/458 |
| 2013/0221707 A1 | 8/2013 | Huttenlocher | |
| 2014/0091597 A1* | 4/2014 | Inoue | B62J 17/00 296/192 |
| 2015/0078817 A1 | 3/2015 | Yamauchi | |
| 2015/0174740 A1* | 6/2015 | Morris | B25B 11/02 29/559 |
| 2015/0298632 A1* | 10/2015 | Chiba | B60R 19/24 296/1.08 |
| 2017/0174150 A1* | 6/2017 | Thota | B60R 13/04 |
| 2019/0084499 A1* | 3/2019 | Pinon Perez | F16B 5/06 |
| 2020/0049178 A1* | 2/2020 | Harris | F16B 2/245 |

FOREIGN PATENT DOCUMENTS

| | | |
|---|---|---|
| DE | 199 48 165 A1 | 4/2001 |
| DE | 10 2005 023 719 A1 | 11/2006 |
| DE | 601 33 532 T2 | 6/2009 |
| DE | 10 2010 050 515 A1 | 5/2012 |
| DE | 10 2013 010 490 A1 | 12/2014 |
| JP | 10-324204 A | 12/1998 |
| JP | 2015-45346 A | 3/2015 |

OTHER PUBLICATIONS

German-language Written Opinion (PCT/ISA/237) issued in PCT Application No. PCT/EP2016/079234 dated Feb. 3, 2017 (five pages).

German-language Search Report issued in counterpart German Application No. 10 2016 201 521.4 dated Sep. 13, 2016 with partial English translation (13 pages).

Chinese Office Action issued in Chinese application No. 201680057584.3 dated Jun. 22, 2020, with English translation (Twelve (12) pages).

* cited by examiner

PANEL ASSEMBLY FOR A MOTOR VEHICLE

CROSS REFERENCE TO RELATED APPLICATIONS

This application is a continuation of PCT International Application No. PCT/EP2016/079234, filed Nov. 30, 2016, which claims priority under 35 U.S.C. § 119 from German Patent Application No. 10 2016 201 521.4, filed Feb. 2, 2016, the entire disclosures of which are herein expressly incorporated by reference.

BACKGROUND AND SUMMARY OF THE INVENTION

The invention relates to a trim panel arrangement for a motor vehicle having a first trim panel element and a second trim panel element which is connected to the first trim panel element.

In automotive engineering, the fastening of trim panel parts to the vehicle represents a particular challenge. For instance, a gap is usually provided between two adjacent trim panel parts, the width of said gap is called a panel gap and represents an important factor for structural aspects, but also for the aerodynamics of the vehicle. Panel gaps which are homogeneous and as small as possible are particularly difficult to achieve in series production on account of component tolerances which occur. Small and homogeneous panel gaps are thus considered to be a particular characteristic of high quality vehicles and require complicated alignment of the adjacent components and reliable, reproducible manufacture.

The compliance with high tolerance requirements is a great challenge, in particular, in the case of adjacent trim panel parts which are connected directly to one another and have to be aligned correctly in the process. However, an unintentional displacement of the trim panel parts during mutual screwing can occur even in the case of an initially correctly aligned arrangement. One cause lies in the torques which occur and act on the trim panel parts in a punctiform manner during screwing, in particular during final tightening of the screws.

As a consequence of said displacements of the trim panel parts with respect to one another, the trim panel parts can come into frictional contact with one another, as a result of which stresses in the trim panel parts and a disruptive development of noise can be observed. In general, even very small differences in the parallel positioning and panel gap can lead to undesired aerodynamic and aero-acoustic phenomena and, moreover, can be perceived easily with the naked eye.

It is therefore an object of the invention to provide a trim panel arrangement which reduces or overcomes the above-mentioned disadvantages and permits an assembly which is as simple and reproducible as possible.

This and other objects are achieved by a trim panel arrangement for a motor vehicle having a first trim panel element and a second trim panel element which is connected to the first trim panel element, the first trim panel element comprising a fastening projection which is connected by way of a connector to a receiving section which is configured on the second trim panel element. Moreover, the fastening projection comprises a latching lug for latching engagement into a latching opening of the second trim panel element, which latching opening is configured in the receiving section.

The trim panel arrangement which is described therefore provides two trim panel elements which are firstly fastened to one another with the aid of the connector. To this end, the fastening projection is provided on the first trim panel element, which fastening projection is fastened to the receiving section of the second trim panel element. In addition to said connection, a latching connection is provided which is formed by way of the latching lug of the fastening projection and the latching opening of the second trim panel element, in order to provide an (additional) positively locking connection. The latching lug can be configured, for example, as a tongue with a bead on a tip of the tongue, which bead acts as a hook.

An arrangement of this type affords the particular possibility that the two trim panel elements can first of all be clipped to one another in a positively locking manner with the aid of the latching lug which engages into the latching opening, and can be held in position in the connected state. Subsequent additional fixing is achieved by way of the use of the connector which supplements the initially performed latching connection in an assisting manner. The assembly is therefore considerably facilitated on account of the initially provided latching connection and the "pre-positioning" of the trim panel elements which is achieved as a result, since said trim panel elements do not both have to be held at the same time in the provided position by an assembly worker, in order to attach the connector. Instead, the two trim panel elements are fixed on one another and positioned correctly with respect to one another by way of the latching connection.

The common arrangement of the latching lug and the connector on the fastening projection additionally results in the effect that an undesired displacement of the trim panel elements with respect to one another on account of an action of force, in particular on account of an action of torque, during the introduction of the connector is reduced considerably, as a result of which a more precise and reproducible arrangement is made possible.

A reduction in the disruptive actions of force can additionally be achieved by the connector being arranged adjacently with respect to the latching lug in as close a manner as possible.

The trim panel arrangement is described merely using one latching connection and one connector. It goes without saying, however, that the trim panel arrangement can likewise have a plurality of said latching connections and a plurality of said connectors which are configured in each case in the same way.

The first and/or the second trim panel element are/is preferably configured as a plastic part, in particular as injection molded parts or deep drawn parts. The fastening projection and/or the receiving section can correspondingly be molded onto the respective remaining trim panel element or can already be manufactured jointly with the latter. The fastening projection and/or the receiving section are/is likewise preferably configured in one piece with the respective associated first or second trim panel element.

According to one preferred embodiment, the fastening projection is arranged on a rear side of the first trim panel element, which rear side faces away from an outer visible side. The visible side represents a surface of the trim panel element, which surface can be seen from the outside. In contrast, the fastening projection is arranged on the rear side which faces away from said surface, as a result of which said fastening projection is obscured toward the outside by way of the trim panel element or its visible side. For example, the rear side faces the vehicle interior and therefore as a rule remains concealed to an observer of the vehicle.

According to a further embodiment, the fastening projection and the receiving section in each case comprise a through opening for receiving the connector. Accordingly, a through opening is provided in each case in the two components, which two components are arranged in an aligned manner with respect to one another in an installed state, with the result that the connector can be inserted into the two through openings, in order to connect the two components to one another. Here, the fastening projection and the receiving section preferably lie flatly on one another and are pressed onto one another by means of the connector. For example, the connector can comprise a screw or rivet. In the case of a screw, it can be screwed to a nut, in particular a plug-in nut. As an alternative, the through opening of the first and/or the second trim panel element can have a thread.

The through opening of the fastening projection is likewise provided directly adjacently with respect to the latching lug, in particular in its root region or in the latching lug itself. In these cases, the two fastening points which are formed by the latching connection and the connector are combined spatially and torques which occur on the trim panel arrangement are again reduced considerably.

Furthermore, the receiving section can comprise an indentation in the second trim panel element, the latching opening being configured in a lateral wall of the indentation, and the through opening of the receiving section being configured in a bottom section of the indentation. In addition, it is possible that the space which is formed by the indentation is designed to receive the fastening projection.

The latching opening is preferably configured in such a way that it fixes the latching lug at least in a push-in direction. The latching lug is therefore pushed into the latching opening in the push-in direction and is latched there, for example by engaging behind an edge section of the latching opening. A backward movement counter to the push-in direction is prevented effectively by way of the latching lug.

In addition, the latching opening can have a greater width in a lateral direction which is oriented perpendicularly with respect to the push-in direction than a width of the latching lug. In this way, a certain amount of clearance is provided for the latching lug, with the result that the latching lug can either already be pushed into the latching opening in a manner which is offset slightly in the lateral direction and/or can be displaced in the lateral direction after being pushed in. In both cases, tolerance compensation is made possible in this way. Subsequently, the two trim panel elements are fixed by way of the connector.

In order to fix an alignment of the two trim panel elements in the push-in direction, the first and/or the second trim panel element can comprise at least one stop which defines a position of the latching lug, in which it is pushed in completely in the push-in direction. Further pushing in the push-in direction is prevented in this way. In the opposite direction, the latching lug prevents a corresponding reverse movement.

Furthermore, a stop of the at least one stop can be arranged on the latching lug and/or spaced apart from the latching lug. In the case of a stop which is spaced apart from the latching lug, said stop can be arranged, for example, in a region of a component edge of the first or second trim panel element, which component edge faces the other trim panel element.

Moreover, the motor vehicle can be a motorcycle or a vehicle which is similar to a motorcycle, in particular a scooter, a two-wheel, three-wheel or four-wheel motor scooter, a quad or a trike.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
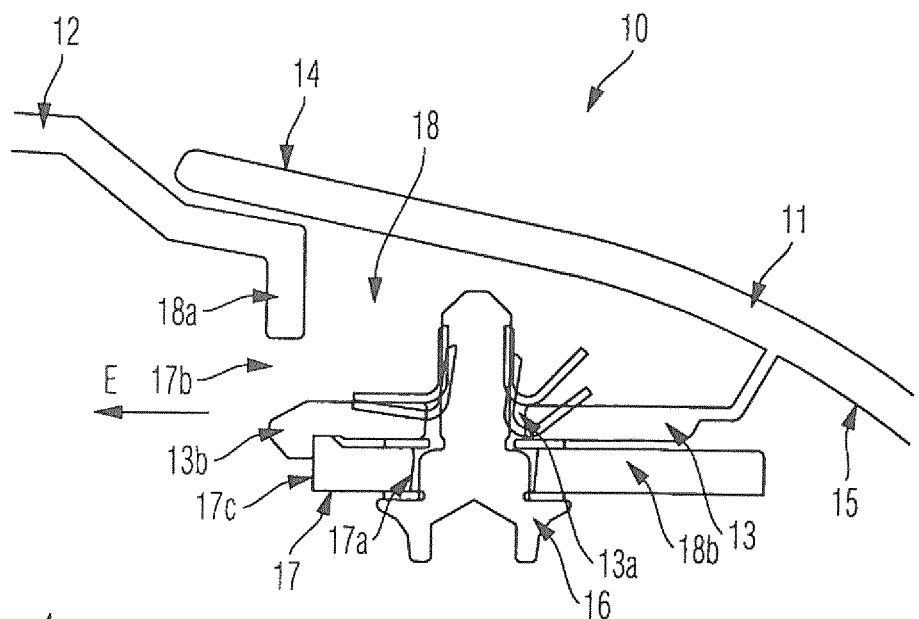
FIG. 1 is a side sectional view of a trim panel arrangement according to an embodiment of the invention.

FIG. 1 shows a trim panel arrangement 10 for a motor vehicle, which trim panel arrangement 10 includes a first trim panel element 11 and a second trim panel element 12 which is connected to the first trim panel element 11. The first trim panel element 11 in turn has a fastening projection 13 which is arranged on a rear side 15 of the first trim panel element 11, which rear side 15 faces away from an outer visible side 14, and is connected by way of a connector 16 which is configured as a screw to a receiving section 17 which is configured on the second trim panel element 12. To this end, the fastening projection 13 and the receiving section 17 in each case have a through opening 13a, 17a which are provided such that they are oriented flush with respect to one another in order to receive the connector 16. The connector may be, for example, a screw 16 which engages into a nut, in particular a plug-in nut. It goes without saying, however, that other connectors can also be used, for example a rivet.

The fastening projection 13 has a latching lug 13b which is configured as a tongue and engages in a latching manner into a latching opening 17b of the second trim panel element 12, which latching opening 17b is configured in the receiving section 17, as a result of which a latching connection of the two trim panel elements 11, 12 to one another is established. The through opening of the first trim panel element 11 is arranged adjacently with respect to the latching lug 13b or with respect to its root region.

Figure 2:
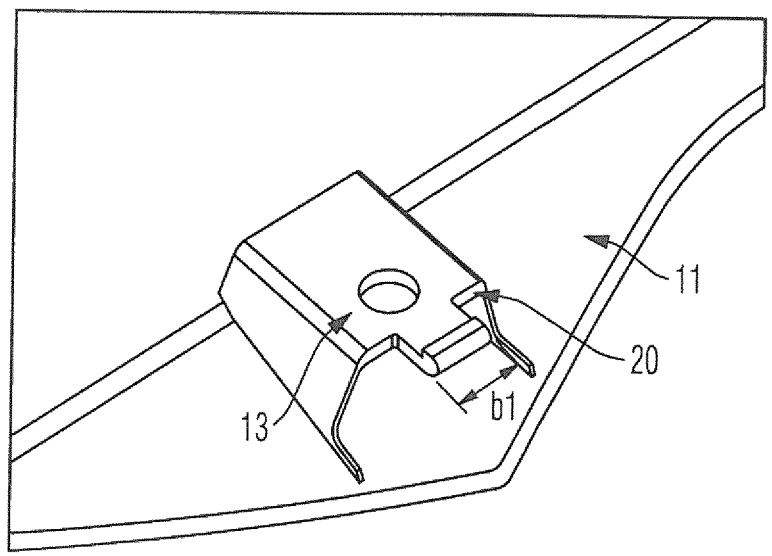
FIG. 2 shows a first trim panel element for a trim panel arrangement according to FIG. 1, in a perspective view.

FIG. 2 shows the first trim panel element 11 for the trim panel arrangement 10 which is shown in FIG. 1, separately and in a perspective view.

Figure 3:
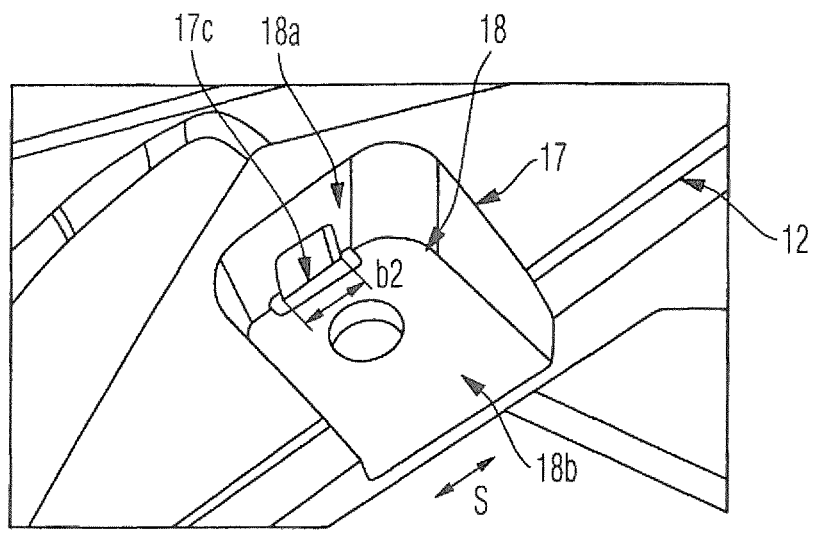
FIG. 3 shows a second trim panel element for the trim panel arrangement according to FIG. 1, in a perspective view.

The second trim panel element 12 is likewise depicted separately and in a perspective view in FIG. 3. Accordingly, the receiving section 17 has an indentation 18 in the second trim panel element 12. The latching opening 17b is configured in a lateral wall 18a of the indentation 18, and the through opening 17a of the receiving section 17 is configured in a bottom section 18b of the indentation 18.

This embodiment makes it possible that the latching opening 17b fixes the latching lug 13b at least in a push-in direction E, by the latching lug 13b engaging behind an edge section 17c which delimits the latching opening 17b, and therefore prevents the latching lug 13b from being released from said engagement counter to the push-in direction E.

In addition, the latching opening 17b can be of wider configuration in a lateral direction S which is oriented perpendicularly with respect to the push-in direction E than the latching lug. This means that the corresponding width b1 of the latching lug 13b is smaller than a width b2 of the latching opening 13b. In FIG. 1, the lateral direction S is oriented, for example, perpendicularly with respect to the plane of the drawing, with the result that a relative movement of the two trim panel elements 11, 12 in order to compensate for tolerances is possible to a certain extent, at least as long as the connector 16 permits this and the two trim panel elements 11, 12 are not yet fixed completely.

The first 11 and/or the second trim panel element 12 can merely optionally include at least one stop which defines a position of the latching lug 13b, in which it is pushed in completely in the push-in direction E. In the exemplary embodiment which is shown, a stop 20 of the at least one stop is arranged directly on the latching lug 13b or in its root region.

Figure 4:
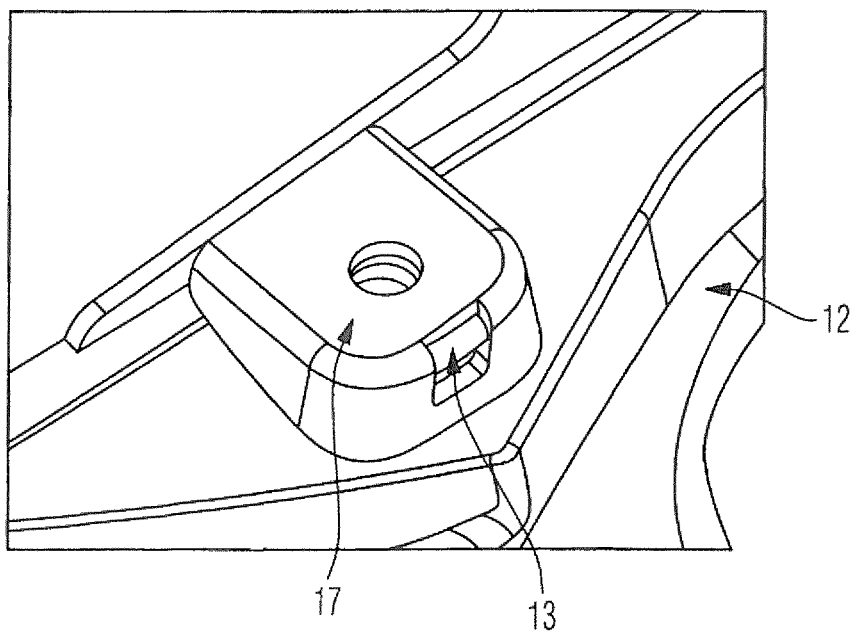
FIG. 4 shows the first and second trim panel elements for the trim panel arrangement according to FIG. 1 in the assembled state, in a perspective view.

FIG. 4 shows the first 11 and second trim panel element 12 for the trim panel arrangement 10 which is described with respect to FIG. 1, in the assembled state in a perspective view before the connector 16 is inserted.

The trim panel arrangement 10 can fundamentally be provided for a motor vehicle, in particular for a motorcycle or a vehicle which is similar to a motorcycle, in particular a scooter, a two-wheel, three-wheel or four-wheel motor scooter, a quad or a trike.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A trim panel arrangement for a motor vehicle, comprising:
    a first trim panel element having a fastening projection;
    a second trim panel element having a receiving section, wherein
    the first trim panel element with the fastening projection is connectable via a connector to the receiving section configured on the second trim panel element, and
    the fastening projection of the first trim panel element comprises a latching lug that engagedly latches into a latching opening configured in the receiving section of the second trim panel element.

2. The trim panel arrangement as claimed in claim 1, wherein
    the fastening projection is arranged on a rear side of the first trim panel element, which rear side faces away from an outer visible side.

3. The trim panel arrangement as claimed in claim 2, wherein
    the fastening projection and the receiving section each have a through opening for receiving the connector.

4. The trim panel arrangement as claimed in claim 3, wherein
    the receiving section comprises an indentation in the second trim panel element,
    the latching opening is configured in a lateral wall of the indentation, and
    the through opening of the receiving section is configured in a bottom section of the indentation.

5. The trim panel arrangement as claimed in claim 1, wherein
    the fastening projection and the receiving section each have a through opening for receiving the connector.

6. The trim panel arrangement as claimed in claim 1, wherein
    the connector comprises a screw or a rivet.

7. The trim panel arrangement as claimed in claim 1, wherein
    the latching opening fixes the latching lug at least in a push-in direction.

8. The trim panel arrangement as claimed in claim 7, wherein
    the latching opening has a greater width in a lateral direction which is oriented perpendicularly with respect to the push-in direction than a width of the latching lug.

9. The trim panel arrangement as claimed in claim 1, wherein
    the first and/or second trim panel element comprises at least one stop which defines a position of the latching lug, in which the latching lug is pushed in completely in the push-in direction.

10. The trim panel arrangement as claimed in claim 9, wherein
    a stop of the at least one stop is arranged on the latching lug and/or spaced apart from the latching lug.

11. The trim panel arrangement as claimed in claim 1, wherein
    the motor vehicle is a motorcycle.

12. The trim panel arrangement as claimed in claim 1, wherein
    the motor vehicle is one of a scooter, a motor scooter, a quad or trike vehicle.

* * * * *